United States Patent
Bangad et al.

(10) Patent No.: US 11,321,155 B2
(45) Date of Patent: *May 3, 2022

(54) AUTOMATIC RESOURCE DEPENDENCY TRACKING AND STRUCTURE FOR MAINTENANCE OF RESOURCE FAULT PROPAGATION

(71) Applicant: BANK OF AMERICA CORPORATION, Charlotte, NC (US)

(72) Inventors: Sunil R. Bangad, Kendall Park, NJ (US); Benjamin Nien-Ting Wu, San Francisco, CA (US); Sridhar M. Seetharaman, Princeton, NJ (US); Praveen Kumar Kasu, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/692,924

(22) Filed: Nov. 22, 2019

(65) Prior Publication Data

US 2020/0089553 A1     Mar. 19, 2020

Related U.S. Application Data

(63) Continuation of application No. 15/674,087, filed on Aug. 10, 2017, now Pat. No. 10,489,225.

(51) Int. Cl.
*G06F 11/32* (2006.01)
*G06F 11/00* (2006.01)
(Continued)

(52) U.S. Cl.
CPC ............ *G06F 11/004* (2013.01); *G06F 9/466* (2013.01); *G06F 9/5011* (2013.01); *G06F 9/547* (2013.01);
(Continued)

(58) Field of Classification Search
CPC ......................................... G06F 11/3636–3644
(Continued)

(56) References Cited

U.S. PATENT DOCUMENTS 6,073,089 A     6/2000 Baker et al.
6,108,700 A     8/2000 Maccabee et al.
(Continued)

OTHER PUBLICATIONS

"Performance Metrics Monitoring with Introscope by Wily"; retrieved online at http://help.sap.com/saphelp-sm71-sp01/helpdata-en-3d/bdd41a171744569b0b39f141d9db3/content.htm, date unknown.
(Continued)

*Primary Examiner* — Jue Louie
(74) *Attorney, Agent, or Firm* — Moore & Van Allen PLLC; James C. Edwards

(57) ABSTRACT

A computing environment includes an originating system, a plurality of networked communication channels each configured to communicate one or more of a plurality of instructions for calling one or more downstream applications in response to calling of an originating application by the first system, and a resource dependency system for providing automatic resource dependency tracking and maintenance of resource fault propagation. The resource dependency system performs a query configured to identify any application calls performed in a predetermined period of time; for each identified application call, builds a corresponding transaction paragraph comprising a list of all sub-application calls performed in response to the application call; from each transaction paragraph, extracts a chronological sequence of sub-application calls found in the transaction paragraph; forms a tier pathway for each transaction paragraph; and stores each tier pathway in an accessible file.

17 Claims, 10 Drawing Sheets

(51) Int. Cl.
*G06F 9/54* (2006.01)
*G06F 9/46* (2006.01)
*G06F 16/2458* (2019.01)
*G06F 9/50* (2006.01)

(52) U.S. Cl.
CPC ...... *G06F 16/2477* (2019.01); *G06F 2201/87* (2013.01)

(58) Field of Classification Search
USPC .................................. 717/126–133, 154–158
See application file for complete search history.

(56) References Cited

U.S. PATENT DOCUMENTS

| | | | |
|---|---|---|---|
| 6,144,961 A | 11/2000 | de la Salle | |
| 6,182,249 B1 | 1/2001 | Wookey et al. | |
| 7,069,263 B1 | 6/2006 | Yee et al. | |
| 7,107,339 B1 | 9/2006 | Wolters | |
| 7,117,219 B1 | 10/2006 | Powers et al. | |
| 7,197,559 B2 | 3/2007 | Goldstein et al. | |
| 7,290,048 B1 | 10/2007 | Barnett et al. | |
| 7,389,211 B2 | 6/2008 | Abu El Ata et al. | |
| 7,392,248 B2 | 6/2008 | Bakalash et al. | |
| 7,448,048 B1 | 11/2008 | Nesamoney et al. | |
| 7,483,968 B1 | 1/2009 | Rambacher et al. | |
| 7,568,025 B2 | 7/2009 | Vasudeva | |
| 7,577,731 B2 | 8/2009 | Frey et al. | |
| 7,640,547 B2 | 12/2009 | Neiman et al. | |
| 7,930,262 B2 | 4/2011 | Friedlander et al. | |
| 7,930,595 B2 | 4/2011 | Gooding | |
| 8,015,176 B2 | 9/2011 | Colby et al. | |
| 8,122,123 B2 | 2/2012 | Bhattacharya et al. | |
| 8,140,682 B2 | 3/2012 | Murthy et al. | |
| 8,209,274 B1 | 6/2012 | Lin et al. | |
| 8,271,537 B2 | 9/2012 | Schabenberger et al. | |
| 8,380,838 B2 | 2/2013 | Bose et al. | |
| 8,437,987 B2 | 5/2013 | Verseput et al. | |
| 8,463,736 B2 | 6/2013 | Bakalash et al. | |
| 8,464,278 B2 | 6/2013 | Nesamoney et al. | |
| 8,495,007 B2 | 7/2013 | Williamson | |
| 8,826,242 B2 | 9/2014 | Livshits et al. | |
| 8,898,643 B2 | 11/2014 | Rode | |
| 9,053,437 B2 | 6/2015 | Adler et al. | |
| 9,152,974 B1 | 10/2015 | Behm et al. | |
| 9,450,849 B1 | 9/2016 | Goldberg et al. | |
| 9,462,014 B1 | 10/2016 | Lin | |
| 9,547,478 B1 | 1/2017 | Hale | |
| 9,547,834 B2 | 1/2017 | Nayyar et al. | |
| 9,557,879 B1 | 1/2017 | Wang et al. | |
| 9,559,928 B1 | 1/2017 | Porter et al. | |
| 9,613,111 B2 | 4/2017 | Gibbons | |
| 9,626,275 B1 | 4/2017 | Hitchcock et al. | |
| 9,760,874 B2 | 9/2017 | Zaidi et al. | |
| 9,996,577 B1 * | 6/2018 | Diep .................. | G06F 3/04842 |
| 10,796,322 B1 * | 10/2020 | Ramalingam ...... | G06Q 30/0202 |
| 10,880,191 B1 * | 12/2020 | Kant .................. | G06F 11/3447 |
| 2002/0016771 A1 | 2/2002 | Carothers et al. | |
| 2002/0198984 A1 | 12/2002 | Goldstein et al. | |
| 2005/0262323 A1 | 11/2005 | Woo et al. | |
| 2006/0178982 A1 | 8/2006 | Ramsey et al. | |
| 2007/0043861 A1 | 2/2007 | Baron et al. | |
| 2008/0059972 A1 | 3/2008 | Ding et al. | |
| 2008/0235041 A1 | 9/2008 | Cashdollar et al. | |
| 2009/0037914 A1 | 2/2009 | Chagoly et al. | |
| 2009/0106741 A1 | 4/2009 | Dageville et al. | |
| 2009/0240711 A1 | 9/2009 | Levin | |
| 2009/0271511 A1 | 10/2009 | Peracha | |
| 2009/0293049 A1 * | 11/2009 | Gorelkina ........... | G06F 11/3612 717/157 |
| 2011/0035485 A1 | 2/2011 | Martin et al. | |
| 2012/0047072 A1 | 2/2012 | Larkin | |
| 2012/0084779 A1 | 4/2012 | Adler | |
| 2012/0109703 A1 | 5/2012 | Agrawal et al. | |
| 2012/0137273 A1 | 5/2012 | Meijler et al. | |
| 2012/0173717 A1 | 7/2012 | Kohli | |
| 2012/0254395 A1 | 10/2012 | Bonas | |
| 2012/0278135 A1 | 11/2012 | Haber | |
| 2012/0284221 A1 | 11/2012 | Shelton et al. | |
| 2013/0013248 A1 | 1/2013 | Brugler et al. | |
| 2013/0219057 A1 | 8/2013 | Li et al. | |
| 2013/0219068 A1 | 8/2013 | Ballani et al. | |
| 2013/0290932 A1 | 10/2013 | Kruglick | |
| 2013/0322255 A1 | 12/2013 | Dillon | |
| 2013/0326055 A1 | 12/2013 | Chatterjee et al. | |
| 2014/0089621 A1 | 3/2014 | Hagspiel et al. | |
| 2014/0090056 A1 | 3/2014 | Manadhata et al. | |
| 2014/0172842 A1 | 6/2014 | Sumanth | |
| 2014/0180809 A1 | 6/2014 | Boal | |
| 2014/0222790 A1 * | 8/2014 | Shepherd .............. | G06F 16/322 707/723 |
| 2014/0280894 A1 | 9/2014 | Reynolds et al. | |
| 2015/0148138 A1 * | 5/2015 | Rabin ..................... | G06F 11/30 463/43 |
| 2015/0222516 A1 | 8/2015 | Deval et al. | |
| 2015/0309777 A1 * | 10/2015 | Salnikov-Tarnovski ..................... G06F 11/3636 717/157 |
| 2016/0026950 A1 | 1/2016 | Kapur et al. | |
| 2016/0042180 A1 * | 2/2016 | Sayre ................... | G06F 21/563 726/23 |
| 2016/0226736 A1 * | 8/2016 | Tran ....................... | H04L 67/025 |
| 2017/0012814 A1 | 1/2017 | Zaidi et al. | |
| 2017/0012837 A1 | 1/2017 | Zaidi et al. | |
| 2017/0012839 A1 | 1/2017 | Zaidi et al. | |
| 2017/0012843 A1 | 1/2017 | Zaidi et al. | |
| 2017/0031741 A1 | 2/2017 | Seigel | |
| 2017/0195183 A1 | 7/2017 | Gershaft et al. | |

OTHER PUBLICATIONS

CA Application Performance Management 9.5 Data Sheet. CA Technologies. Copyright 2013. Retrieved from [http://www.ca.com/us/-/media/Files/DataSheets/ca-application-performance-management.PDF] on Jan. 27, 2014.

CA Application Performance Management. CA Technologies. Copyright 2014. Retrieved from [http://www.ca.com/usapplication-management-details.aspx] on Jan. 27, 2014.

CA Introscope. IBM. Last Modified Jan. 2, 2014. Retrieved from [http://www-304.ibm.com/partnerworld/gsd/solutiondetails.do?solution=23517&expand=true] on Jan. 27, 2014.

* cited by examiner

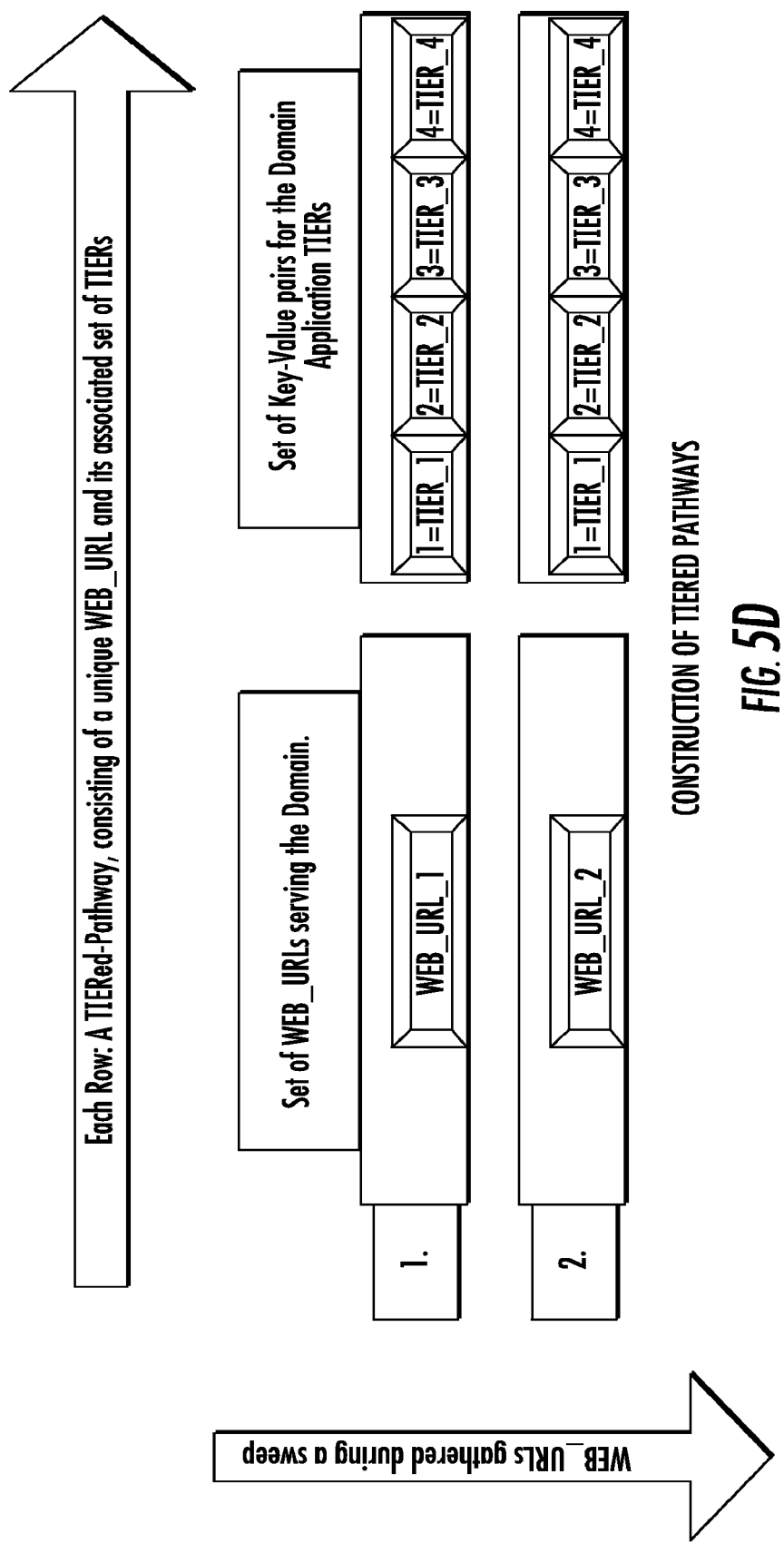
FIG. 5D CONSTRUCTION OF TIERED PATHWAYS

Views ▽ Saved Searches & Reports ▽                                                    Messages ▽ Settings ▽ Activity ▽ Help

Dependency Tracing Dashboard

This dashboard shows dependency of a particular application with all other applications, as they occur in different transaction paragraphs, for all the onboarded applications. It covers all the unique WEB URLs recorded in the Transaction Tracing logs. Each row of the following table consists of a WEB URL and its associated set of application TIERS. Note that the TIERS in a row are recorded preserving the order in which they are callled.

In a TIER PATHWAY, note that, the dotted-connection (" ..... ") between two TIERS indicates a unidirectional relationship, while the dashed-connection (" ---- ") indicates bidirectional relationship. When a TIER is observed to be located on either side of another TIER in the set of pathways, the two TIERS are said to be related with a bidirectional relationship, otherwise it is unidirectional.

If you do not specify a value in a text-field, then that is considered as the "*" value (i.e. as if you selected all possible values). Please note that, the "Generic Search" text-field supports regular expression, while the "WEB URL" and "TIER" drop-down fields support multi-select input.

Generic Search: [APP1]   [NOT ▽]  WEB URL: [         ]  [OR ▽]  TIER: [x APP2]   [Search]

*FIG. 6A*

| S. No. | All LOB Applications WEB URLs | TIER PATHWAYS | | |
|---|---|---|---|---|
| 1. | //url/usecase1.php | APP1......APP2 | | |
| 2. | //url/usecase2/vc2-1/vc2-2.go | APP1......APP3 | | |
| 3. | //url/usecase3.go | APP1......APP4 | | |
| 2294. | //url/usecase4/vc4-1/vc4-2/vc4-3.go | APP1......APP3----APP5 | | |
| 2295. | //url/usecase5.go | APP1......APP3 | | |
| 2296. | //url/usecase6.go | APP1....APP5----APP6----APP5----APP3 | | |
| 2297. | //url/usecase7/vc7-1/vc7-2.go | APP1....APP3----APP6----APP3 | | |
| 2878. | //url/usecase8/vc8-1.go | 1.....6----7----8----5----9----10----11 | | |
| 2879. | //url/usecase9.go | 1.....6.....12----7----5----11----10----8 | | |
| 2880. | //url/usecase10/vc10-1/vc10-2.go | 1.....6----11----10----5 | | |
| 2881. | //url/usecase11.go | 1.....6----12----10.....12----9----8----7----5 | | |
| 2882. | //url/usecase12.go | 1.....6----10----12----5 | | |
| 9140. | //url/usecase13.go | 1......13 | | |
| 9141. | //url/usecase14/vc14-1/vc14-2/vc14-3.go | 1......13 | | |

FIG. 6B

AUTOMATIC RESOURCE DEPENDENCY TRACKING AND STRUCTURE FOR MAINTENANCE OF RESOURCE FAULT PROPAGATION

CROSS-REFERENCE TO RELATED APPLICATION

This application is a continuation of and claims priority from allowed, co-pending U.S. patent application Ser. No. 15/674,087, filed on Aug. 10, 2017 and entitled "Automatic Resource Dependency Tracking and Structure for Maintenance of Resource Fault Propagation".

FIELD

In general, embodiments of the invention relate to resource dependency tracking and, more particularly, to a structure for maintenance of resource fault propagation.

BACKGROUND

In various technical environment implementations, application calls require multiple calls of other applications. In some cases, a fault exists in relation to an application downstream from an originating application. Thus, any application relying on such a faulty application may be negatively impacted.

Therefore, a need exists to develop systems, apparatus, computer program products, methods and the like that provide for automatic resource dependency tracking and maintenance of resource fault propagation.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for providing automatic resource dependency tracking and maintenance of resource fault propagation.

According to embodiments of the invention described herein, various systems, apparatus, methods, and computer program products are provided for automatic resource dependency tracking and structure for maintenance of resource fault propagation. Embodiments of the invention are directed to monitoring applications running within an enterprise, such as applications called in response to a client interaction within an outward-facing interface. When applications are called or utilized within the entity, the invention identifies other application calls necessary for functionality of the application and builds a database of the entity's applications and links their dependencies on other applications. Users may navigate a Dependency Tracing or Tracking Dashboard to perform tier-level and/or generic searches for particular applications and/or tiers of applications. The invention enables users to drastically reduce the number of applications to inspect in the case of an outage or other problem.

According to embodiments of the invention, a computing environment includes an originating system having a computing platform having a memory and at least one processor in communication with the memory; a plurality of networked communication channels each configured to communicate one or more of a plurality of instructions for calling one or more downstream applications in response to calling of an originating application by the first system; and a resource dependency system in operative communication with the first system and the plurality of networked communication channels and for providing automatic resource dependency tracking and maintenance of resource fault propagation and comprising a computing platform having a memory and at least one processor in communication with the memory. The memory includes computer-executable instructions, that when executed cause the processor to perform a query configured to identify any application calls performed in a predetermined period of time; for each identified application call, build a corresponding transaction paragraph comprising a list of all sub-application calls performed in response to the application call; from each transaction paragraph, extract a chronological sequence of sub-application calls found in the transaction paragraph; form a tier pathway for each transaction paragraph, the tier pathway comprising the application call and each sub-application call and information indicating the chronological sequence relating the application call and the sub-application calls; and store each tier pathway in an accessible file.

In some embodiments, the computer-executable instructions, when executed further cause the processor to periodically perform subsequent queries; and add additional tier pathways to the accessible file based on the subsequent query results.

In some embodiments, the computer-executable instructions, when executed further cause the processor to determine that one or more tier pathway stored in the accessible file is obsolete; and periodically purge the obsolete tier pathway from the accessible file.

In some embodiments, the computer-executable instructions, when executed further cause the processor to determine which of the identified application calls were unique and eliminate duplicate application calls from an application call list; and reduce the application call list to a predetermined threshold number of application calls; and wherein the building is from the application calls that are part of the application call list.

In some embodiments, the computer-executable instructions, when executed further cause the processor to add a timestamp indicating a date and time of discovery of each tier pathway to the tier pathway. In some such embodiments, the computer-executable instructions, when executed further cause the processor to update the timestamp for every preexisting tier pathway in the accessible file.

In some embodiments, the computer-executable instructions, when executed further cause the processor to determine that one or more tier pathway stored in the accessible file is obsolete by examining its timestamp and determining that the timestamp is older than a predetermined threshold of time; and, in response, purge the obsolete tier pathway from the accessible file.

According to embodiments of the invention, a method provides automatic resource dependency tracking and maintenance of resource fault propagation. The method includes communicating, by a plurality of networked communication channels, one or more of a plurality of instructions for calling one or more downstream applications in response to calling of an originating application by a first system;

performing, by a resource dependency system in operative communication with the first system and the plurality of networked communication channels, a query configured to identify any application calls performed in a predetermined period of time; for each identified application call, building, by the resource dependency system, a corresponding transaction paragraph comprising a list of all sub-application calls performed in response to the application call; from each transaction paragraph, extracting, by the resource dependency system, a chronological sequence of sub-application calls found in the transaction paragraph; forming, by the resource dependency system, a tier pathway for each transaction paragraph, the tier pathway comprising the application call and each sub-application call and information indicating the chronological sequence relating the application call and the sub-application calls; and storing, by the resource dependency system, each tier pathway in an accessible file.

In some embodiments, the method also includes periodically performing, by the resource dependency system, subsequent queries; and adding, by the resource dependency system, additional tier pathways to the accessible file based on the subsequent query results.

In some embodiments, the method also includes determining, by the resource dependency system, that one or more tier pathway stored in the accessible file is obsolete; and periodically purging, by the resource dependency system, the obsolete tier pathway from the accessible file.

In some embodiments, the method also includes determining, by the resource dependency system, determine which of the identified application calls were unique and eliminate duplicate application calls from an application call list; and reducing, by the resource dependency system, the application call list to a predetermined threshold number of application calls; and wherein the building is from the application calls that are part of the application call list.

In some embodiments, the method also includes adding, by the resource dependency system, a timestamp indicating a date and time of discovery of each tier pathway to the tier pathway. In some such embodiments, the method includes updating, by the resource dependency system, the timestamp for every preexisting tier pathway in the accessible file.

In some embodiments, the method includes determining, by the resource dependency system, that one or more tier pathway stored in the accessible file is obsolete by examining its timestamp and determining that the timestamp is older than a predetermined threshold of time; and, in response, purging, by the resource dependency system, the obsolete tier pathway from the accessible file.

According to embodiments of the invention, a computer program product for providing automatic resource dependency tracking and maintenance of resource fault propagation includes a non-transitory computer-readable medium comprising a set of codes for causing the first computer to communicate one or more of a plurality of instructions for calling one or more downstream applications in response to calling of an originating application by a second computer; a set of codes for causing a third computer to perform a query configured to identify any application calls performed in a predetermined period of time; a set of codes for causing the third computer to, for each identified application call, build a corresponding transaction paragraph comprising a list of all sub-application calls performed in response to the application call; a set of codes for causing the third computer to, from each transaction paragraph, extract a chronological sequence of sub-application calls found in the transaction paragraph; a set of codes for causing the third computer to, form a tier pathway for each transaction paragraph, the tier pathway comprising the application call and each sub-application call and information indicating the chronological sequence relating the application call and the sub-application calls; and a set of codes for causing the third computer to store each tier pathway in an accessible file.

In some embodiments, the computer-readable medium further comprises a set of codes for causing the third computer to periodically perform subsequent queries; and a set of codes for causing the third computer to add additional tier pathways to the accessible file based on the subsequent query results.

In some embodiments, the computer-readable medium further comprises a set of codes for causing the third computer to determine that one or more tier pathway stored in the accessible file is obsolete; and a set of codes for causing the third computer to periodically purge the obsolete tier pathway from the accessible file. In some such embodiments, the computer-readable medium further comprises a set of codes for causing the third computer to determine which of the identified application calls were unique and eliminate duplicate application calls from an application call list; and a set of codes for causing the third computer to reduce the application call list to a predetermined threshold number of application calls; and wherein the building is from the application calls that are part of the application call list.

In some embodiments, the computer-readable medium further comprises a set of codes for causing the third computer to add a timestamp indicating a date and time of discovery of each tier pathway to the tier pathway.

In some embodiments, the computer-readable medium further comprises a set of codes for causing the third computer to, when executed further cause the processor to update the timestamp for every preexisting tier pathway in the accessible file.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
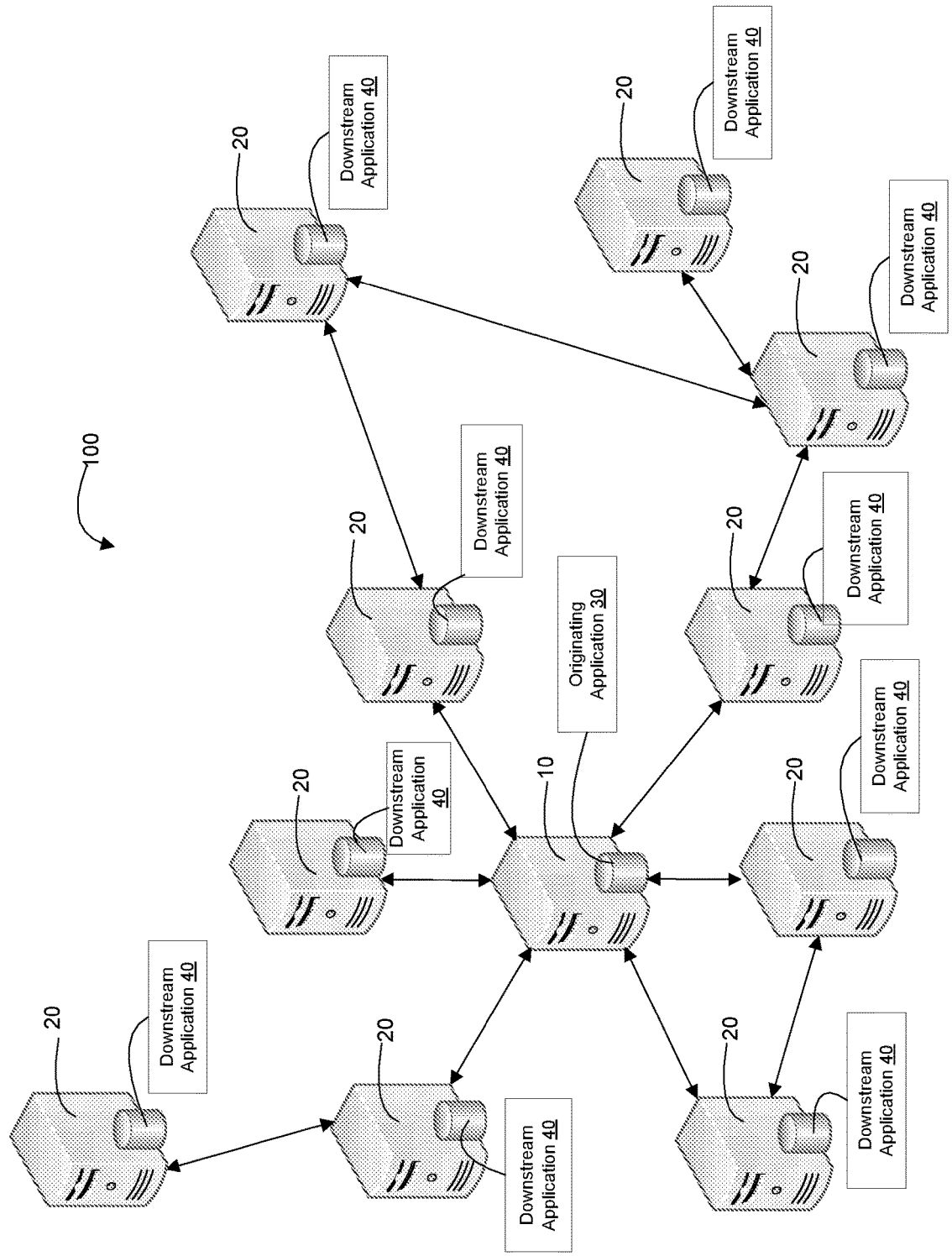
Figure 2:
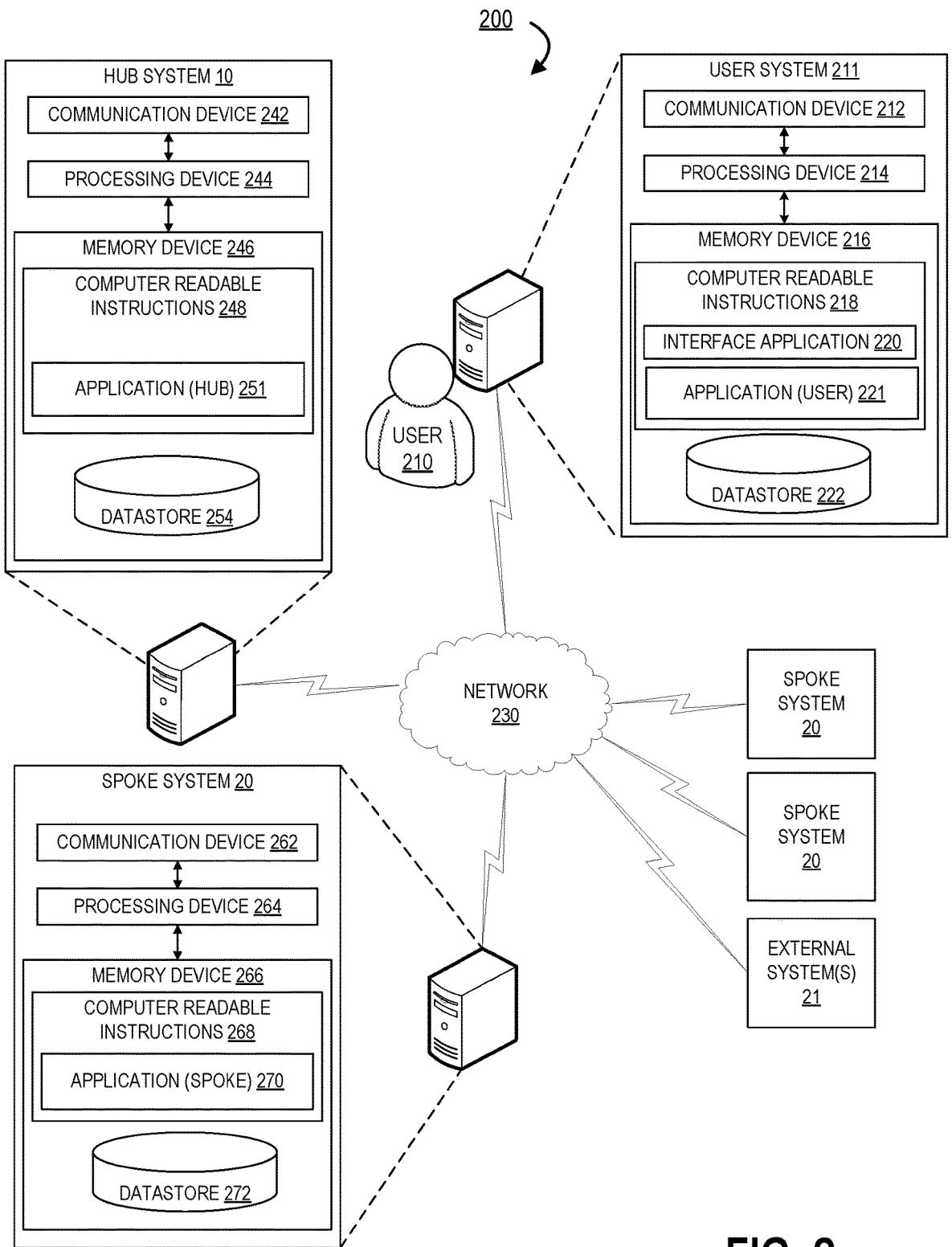
Figure 3:
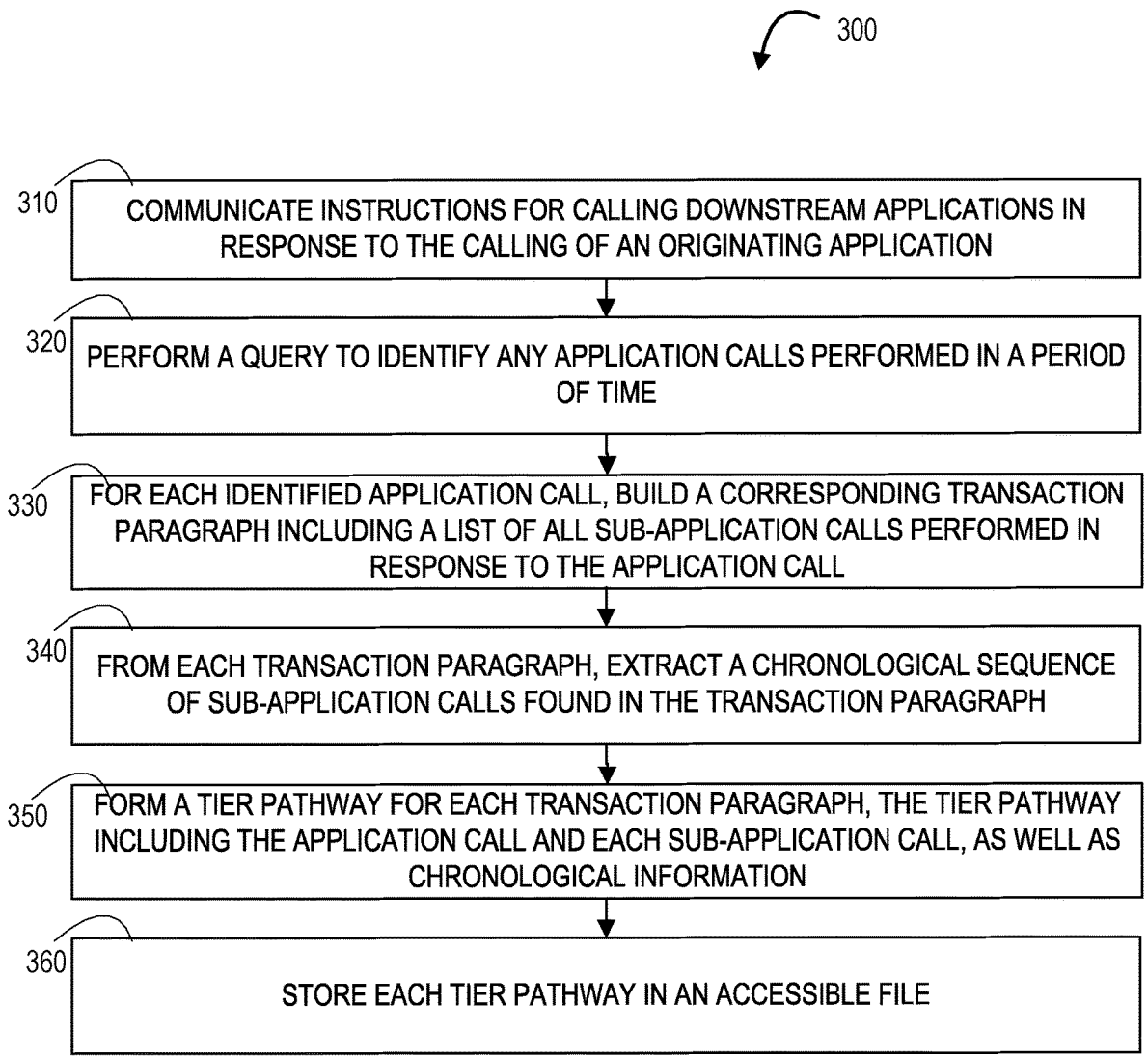
Figure 4:
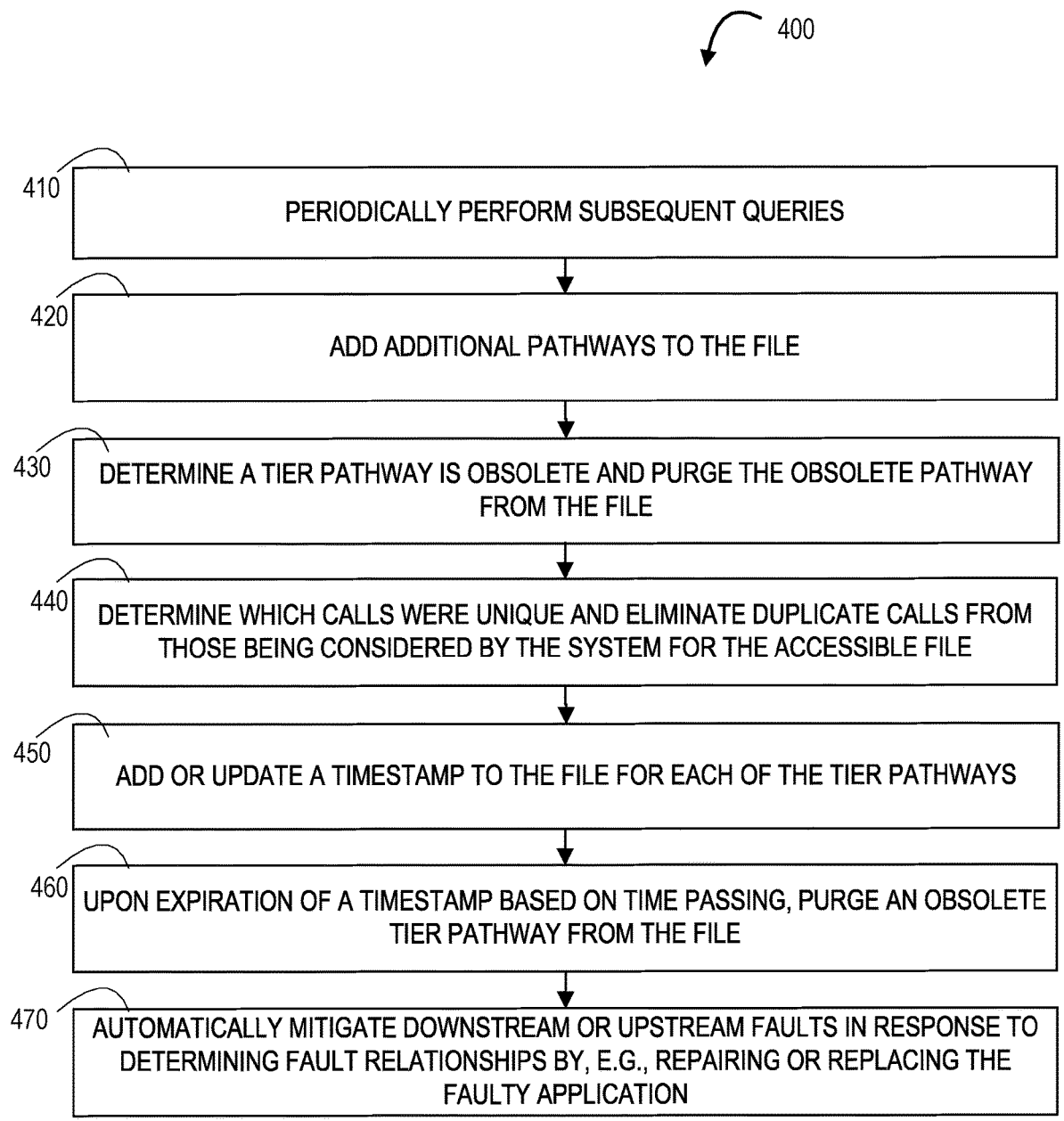

Having thus described embodiments of the invention in general terms, reference will now be made to the accompanying drawings, which are not necessarily drawn to scale, and wherein:

FIG. 1 provides a schematic diagram of a system for automatic resource dependency tracking and maintenance of resource fault propagation, in accordance with embodiments of the present invention;

FIG. 2 provides a schematic diagram of an environment in which systems discussed herein operate, in accordance with embodiments of the present invention;

FIG. 3 provides a flowchart of a method for automatic resource dependency tracking and maintenance of resource fault propagation, in accordance with embodiments of the present invention;

FIG. 4 provides a flowchart of a method for automatic resource dependency tracking and maintenance of resource fault propagation including additional steps, in accordance with embodiments of the present invention;

FIGS. 5A-5D provide illustrations of relationships between applications and additional process flows and diagrams, in accordance with embodiments of the present invention; and FIGS. 6A-6B provide representations of screenshots of a user interface running on a user system, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are provided for automatic resource dependency tracking and structure for maintenance of resource fault propagation. Embodiments of the invention are directed to monitoring applications running within an enterprise, such as applications called in response to a client interaction within an outward-facing interface. When applications are called or utilized within the entity, the invention identifies other application calls necessary for functionality of the application and builds a database of the entity's applications and links their dependencies on other applications. Users may navigate a Dependency Tracing or Tracking Dashboard to perform tier-level and/or generic searches for particular applications and/or tiers of applications. The invention enables users to drastically reduce the number of applications to inspect in the case of an outage or other problem.

Enterprise users could generally use additional application relationship visibility to assist in their everyday tasks. For example, for connected applications, answers to the following high level questions may be useful for enterprise users:

(i) how the application is affected by an action such as a related application call;

(ii) what set of applications are dependent upon a specific application;

(iii) which connected applications have some SOR dependency;

(iv) what is the strength of dependency between any two applications;

(v) what percentage of use-cases are served by a specified application; and (vi) what alternative paths (such as data communications pathways or application calls) satisfy a particular use-case.

More specifically, embodiments of the invention provide information related to all the applications that are dependent on an originating application for their execution, whether the originating application is connected in some fashion (directly or indirectly) with a System of Record (SOR), whether a detected issue with an application can be expected to spread in the near future, the strength of dependency relationship between any two applications in a domain, the percentage amount of use cases a particular application serves in the domain, how to trace back to an application(s) that may be the cause of a slowdown if users complain of the slowdown of a particular functionality in a particular line of business, using "heatmaps" to investigate a malfunction.

As a specific example, if App One is linked to App Two by Link A, which is in turn linked to App Three by Link B, then an application failure of either of App Two or App Three, a slowdown of App Two or App Three, a link failure of Link A or Link B would result in App One's use-case failure.

The raw data of transaction tracing for applications may form the basis for successive data refinements of the transaction tracing data that may lead to the source of an issue. For example, the raw data of applications may be narrowed into summary data, which may be broken down into table of transaction paragraphs, then tiered pathways and finally to islands of sibling dependencies.

The transaction tracing process mimics the path of an operational intelligence platform. Namely, a reactive process may involve using silos or individual application logs being pulled into a database model. Such reactive processes may act like cost centers with higher expenses. A proactive based transaction tracing standards process may be somewhat less costly but is technology-centric just as a reactive process. A service based process such as one that uses shared services, domain-based applications, automations, validators, on-boardings and common integrated environments are more internal-customer and service-centric than the reactive or proactive processes and have lower expenses. Finally, a differentiation process is a profit and insight generator that is an external-customer and market-centric process that acts like a profit center with low expenses.

Embodiments of the invention provide for a number of users to utilize a web interface for access to a domain on the enterprise systems. The domain accesses a number of log files, which are translated into a standard format. Periodically, such as every night or during some other system downtime or slow period, the invention performs a search. The query that is executed determines a tier or transaction paragraph indicating the application calls and any other actions or resources that are called or relied upon for execution of the initial application. Thus, if an application was called in the previous period (e.g., during the previous day), then the invention builds a look-up table relating each of the actions and resources also relied upon for execution of the application call. This may be done in the form of an index bucket that is parsed for particular fields such as a "WEB_URL" field or a "REQUEST ID" field. Identifying such fields within the index bucket of raw transaction tracing data may lead to determining which other applications, actions or resources are necessary for function of the originally called application. These search results may be stored as a file, such as a ".CSV" file.

Thus, the WEB URLs gathered during a sweep or periodic query may be listed in the file, one per row. For each WEB_URL, a set of Key=Value pairs for the domain application TIERs is determined. Each WEB_URL thus has associated sets of TIER_1, TIER_2, TIER_3 and TIER_4 pairs.

A dependency tracing dashboard may be provided by embodiments of the invention. The dependency tracing dashboard shows dependency of a particular application with all other applications, as they occur in different transaction paragraphs, for all the on-boarded application. It covers all the unique WEB URLs recorded in the raw data (or transaction tracing logs) for the application. Each row of the table consists of a WEB_URL and its associated set of TIERs. The TIERs in a row are recorded preserving the order in which they are called. The dashboard may indicate to a user whether a connection between two TIERS is a uni-directional relationship (such as by a dotted connection: " . . . . .") or a bidirectional relationship (such as by a dashed connection: "- - - - -"). When a TIER is observed to be located on either side of another TIER in a set of pathways, the two TIERs are said to be related with a bidirectional relationship, otherwise it is a unidirectional relationship. A "Generic Search" field is provided to the user for text-field supported regular expressions. "WEB_URL" and "TIER" fields are provided and support multi-select input. This dashboard thus enables a user to search for a particular application, WEB_URL or TIER, resource or action in order to return pathways indicating other applications that may be effected by functionality of the queried input.

Various data model requirements were formulated in order to achieve the desired data model for use by the transaction tracing dashboard. The data model is built from the transaction tracing indexed data for all on-boarded application such that it concisely provides a way to build co-relation amongst TIERs (which may correspond to applications, etc.). The data model is configured to cover all the WEB URLs served by all the applications of the enterprise. The data gathering process is efficient and minimally taxing on the querying tool to account for limited processing bandwidth and other constraints. As discussed in greater detail above, the data model captures uni-directional as well as bi-directional relationships between any two TIERs in the infrastructure. Notably, embodiments of the invention provide for purging obsolete WEB URLs and TIERed pathways periodically, or in other words, removing those that are no longer used by the enterprise. The system maintains a chronological order of calling and called TIERs. Any multiple occurrence of a TIER in the call sequence, without any intervening TIER is collapsed into a single instance in a TIERed pathway. Onboarded applications' display names are available in the transaction tracing application search form and are used to build the TIERed pathways for user convenience.

Generally speaking, embodiments of the invention provide for a process flow that includes performing a query for the available WEB-URLs for some fixed sample duration (such as between 2:00 and 2:30 AM EST, as an example). The system then saves the set of unique WEB URLs. For each WEB_URL, the system picks a number or uses a predetermined number (e.g., twenty (20)) REQUEST IDs and builds the related transaction paragraphs. From these transaction paragraphs, the system extracts the chronological sequence of TIERs that are found in a transaction paragraph. Next, the system appends the newly found (unique) values of TIERed pathways in the lookup table (which may be a .CSV file). A timestamp indicating when it was discovered may also be appended. For an existing pathway in the table, the timestamp may be updated. Every night (or every time the periodic search is performed), the search job may find a relatively small number of new pathways, and thus, the table may grow incrementally over time until it is essentially stabilized but for occasional new entries. When an application goes through some modification (e.g., it serves a new WEB_URL) after a release, the nightly search job will automatically find it and record it in the TIERed pathways table. Also a periodic purge (such as every few months) may be performed on the TIERed pathways table in order to delete obsolete pathways (i.e., those that are no longer in use).

Referring to FIG. 1, a schematic diagram is provided of a system 100 for providing automatic resource dependency tracking and maintenance of resource fault propagation, in accordance with embodiments of the present invention. In some embodiments, the system 100 is configured as a hub-and-spoke model, in which the hub server 10 represents an originating system. In other words, the hub server 10 may be a server, system, computer or the like that includes an originating application 30 that, when called either by the hub server 10 or some other system, requires the call of one or more downstream or spoke applications, which may run on one or more downstream or spoke servers 20, which may be implemented throughout an enterprise or network. Such spoke servers may be deployed in a "hub-and-spoke" formation, and/or may be deployed in one or more linear communication pathways from the hub server 10 along with various interconnections between spoke servers 20 as shown in FIG. 1. For example, the hub server 10 may run an originating application 30 that requires the call of numerous downstream applications 40, one of which is called on a spoke server 20 directly connected with the hub server 10 and another of which is called on a sub-spoke server (not shown) directly connected with the spoke server 20 but not directly connected with the hub server 10, and so forth. To be clear, one linear communication pathway may connect the hub server 10 with one or more spoke servers 20 and sub-spoke servers, or two or more linear and/or more complex communication pathways may connect the hub server 10 with one or more spoke and sub-spoke servers.

The spoke servers 20 may be one or more systems or servers and may constitute or include one or more communication pathways, channels or systems configured to communicate instructions for calling one or more downstream applications 40.

The downstream applications 40 are may be required for performance of the originating application or may be optional for performance of the originating application. In some scenarios, the downstream applications 40 may be called and subsequently it may be determined that a downstream application 40 may be unnecessary for a particular instance of an originating application 30. In some embodiments, the invention distinguishes between such applications such that fault of a downstream application that is unnecessary for operation of an originating application 30 may not be considered a connection, or in some embodiments, such a connection between the applications may be communicated to a user may way of a visual indicator such as "====", "++++++" or the like.

Referring now to FIG. 2, an environment 200 in which a hub system 240 and multiple spoke systems 20 operate is illustrated, in accordance with some embodiments of the invention. The environment 200 includes a user system 211 associated or used with authorization of a user 210 (e.g., an associate, a manager, a vendor or the like), a hub system 10 and multiple spoke systems 20. In some embodiments, one or more of the spoke systems 20 are external systems 21, which may be maintained or managed by third party entities.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The user system 211, the hub system 10 (or hub server) and the spoke systems 20 (or spoke servers) each include a computer system, server, multiple computer systems and/or servers or the like. The hub system 10, in the embodiments shown has a communication device 242 communicably coupled with a processing device 244, which is also communicably coupled with a memory device 246. The processing device 244 is configured to control the communication device 242 such that the hub system 10 communicates across the network 230 with one or more other systems. The processing device 244 is also configured to access the memory device 246 in order to read the computer readable instructions 248, which in some embodiments includes one or more applications 251 or modules, which may or may not be the same as applications and/or modules running on the user system 211 and/or the spoke systems 20. The memory device 246 also includes a datastore 254 or database for storing pieces of data that can be accessed by the processing device 244. In some embodiments, the datastore 254 includes a tier pathway accessible file as discussed herein.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

In some embodiments, data related to tier pathways may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

The user system 211 includes a communication device 212 communicably coupled with a processing device 214, which is also communicably coupled with a memory device 216. The processing device 214 is configured to control the communication device 212 such that the user system 211 communicates across the network 230 with one or more other systems. The processing device 214 is also configured to access the memory device 216 in order to read the computer readable instructions 218, which in some embodiments includes an interface application 220 and application 221. The memory device 216 also includes a datastore 222 or database for storing pieces of data that can be accessed by the processing device 214.

The spoke system 20 includes a communication device 262 communicably coupled with a processing device 264, which is also communicably coupled with a memory device 266. The processing device 264 is configured to control the communication device 262 such that the spoke system 20 communicates across the network 230 with one or more other systems. The processing device 264 is also configured to access the memory device 266 in order to read the computer readable instructions 268, which in some embodiments includes an application 270. The memory device 266 also includes a datastore 272 or database for storing pieces of data that can be accessed by the processing device 264.

In some embodiments, the application (hub) 251, the application (user) 221 and the application (spoke) 270 interact with one another to implement the process steps described herein. In some embodiments, the application 251 is called and one or more spoke applications such as application 270 are called to support application 251. In some such cases, the application 221 queries the system or environment periodically as described herein to identify the application calls and their various relationships, among other process steps described further below.

The applications 220, 221, 251, and 270 are for instructing the processing devices 214, 244 and 264 to perform various steps of the methods discussed herein, and/or other steps and/or similar steps. In various embodiments, one or more of the applications 220, 221, 251, and 270 are included in the computer readable instructions stored in a memory device of one or more systems or devices other than the systems 10, 20 and 211. For example, in some embodiments, the application 220 is stored and configured for being accessed by a processing device of one or more external systems 21 connected to the network 230. In various embodiments, the applications 220, 221, 251, and 270 stored and executed by different systems/devices are different. In some embodiments, the applications 220, 221, 251, and 270 stored and executed by different systems may be similar and may be configured to communicate with one another, and in some embodiments, the applications 220, 221, 251, and 270 may be considered to be working together as a singular application despite being stored and executed on different systems.

In various embodiments, one of the systems discussed above, such as the hub system 10, is more than one system and the various components of the system are not collocated, and in various embodiments, there are multiple components performing the functions indicated herein as a single device. For example, in one embodiment, multiple processing devices perform the functions of the processing device 244 of the hub system 10 described herein. In various embodiments, the hub system 10 includes one or more of the external systems 21 and/or any other system or component used in conjunction with or to perform any of the method steps discussed herein.

In various embodiments, the hub system 10, the spoke system 20, and the user system 211 and/or other systems may perform all or part of one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 3, a flowchart illustrates a method 300 for automatic resource dependency tracking and maintenance of resource fault propagation according to embodiments of the invention. The first step, as represented by block 310 is to communicate instructions for calling downstream applications in response to the calling of an originating application. In some embodiments, an application affects upstream applications as well, and the system may recognize the relationship and perform the various steps of the disclosed process based on such a relationship rather than an application call—downstream application call relationship.

Various communication channels may exist among multiple systems of an entity or environment as represented in FIGS. 1 and 2 by the spoke systems 20 and their connections with the hub system 10. In various embodiments, only one channel is used. In some cases, more than one channel is used. In some cases, only those channels with relevant information are used. This may be determined based on user input or based on communications from spoke control systems such as a business group's server sending instructions to the hub system to configure and/or activate a communication channel with a spoke system so that relevant information may be communicated across the channel. In some cases, when the spoke control system detects that new information or otherwise relevant information may be available at one or more spoke systems, the spoke control system sends control signals that cause the hub system to establish a dedicated communication channel between the hub system and the one or more spoke systems that may have relevant information. In some cases, the dedicated communication channel is optimized so that the information may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the hub system may optimize parameters of the dedicated communication channel such that the communication channel is less prone to interruption from security breach, other traffic, offline systems or the like. This may be done by, for example, designating certain systems on the network between the hub system and the various spoke systems, respectively, as low-functioning, medium-functioning, or high-functioning network systems/hubs/connections/channels (collectively referred to as network systems). In various other embodiments, the number of categories of systems may be raised or lowered. For example, there may be five (5) distinct categories of systems. The various network systems may be categorized by one or more administrators and/or automatically based on one or more monitoring modules or applications running on the hub and/or spoke systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the spoke control systems and/or the hub system may optimize the dedicated communication channel by selecting appropriately categorized network systems for the communication channel. For example, the hub system may establish a dedicated communication channel in order to receive information associated with high priority work (as indicated by a spoke control system, for example, in its control signals to the hub system). When establishing the dedicated communication channel, the hub system may only select high-functioning network systems in order to ensure that the high priority information may be reliably communicated from the spoke system(s) to the hub system. In another example, certain spoke systems are designated or categorized and always provided a dedicated (or non-dedicated) communication channel based on their respective categorization.

The next step, as represented by block 320, is to perform a query (also referred to herein as a sweep) to identify any application calls performed in a period of time. For example, the system may perform a query every night at two o'clock (2:00) AM in order to minimize or eliminate any potential disruption of environment resources.

The next step, as represented by block 330, is for each identified application call, to build a corresponding transaction paragraph including a list of all sub-application calls performed in response to the application call. The next step, as represented by block 340, is from each transaction paragraph, to extract a chronological sequence of sub-application calls found in the transaction paragraph. The next step, as represented by block 350, is to form a tier (or "TIER") pathway for each transaction paragraph. In some embodiments, the tier pathway includes the application call (e.g., a web-url) and each sub-application call (e.g., another web-url). In some embodiments, the tier pathway also includes the chronological information related to the tier pathway.

The final step, as represented by block 360, is to store each tier pathway in an accessible file for future access, analysis and consideration by administrators.

Referring now to FIG. 4, a flowchart illustrates a method 400 for providing automatic resource dependency tracking and maintenance of resource fault propagation including one or more additional (and in some cases optional) steps according to embodiments of the invention. The first step, as represented by block 410, is to periodically perform subsequent queries and, as a result of such queries, perform the various steps disclosed herein, thereby resulting in adding additional pathways to the file (or updating existing pathways in the file), as represented by block 420.

The next step, as represented by block 430, is to determine a tier pathway is obsolete and purge the obsolete pathway from the file. This may be done by referencing a timestamp that is associated with or part of the tier pathway. If the timestamp is expired, that is, refers to a time that is beyond a threshold, such as one (1) year or one (1) month or the like, then the tier pathway may be purged from the accessible file. In this regard, the accessible file is kept up-to-date. In other embodiments, a tier pathway may be determined to be obsolete by recognizing that some piece of information contained therein is inaccurate, in which case it may be removed from the file and a new, updated tier pathway may be added to the file. For example, if the system determines through the sweep that an originating application is dependent upon a specific downstream application, and therefore the stored tier pathway representing that relationship is obsolete, the system may remove the obsolete tier pathway and replace it with an accurate tier pathway.

The next step, as represented by block 440, is to determine which calls discovered by the query were unique and eliminate duplicate calls from those being considered by the system for the accessible file. In some cases, the system may use a predetermined number of unique calls (such as twenty (20), ten (10), three (3) or some other number) so that system resources are not overloaded if a large number of unique calls are found. Once the unique number of calls are determined, the process may move along to building a transaction paragraph for each unique call (as discussed above with reference to block 330).

The next step, as represented by block 450, is to add or update a timestamp to the file for each of the tier pathways. This timestamp may represent the date and time an application was called. In some embodiments, the system removes a tier pathway from the file and simply adds a new tier pathway with the updated timestamp when a timestamp for the original tier pathway is no longer accurate.

The next step, as represented by block 460, is upon expiration of a timestamp based on time passing, to purge an obsolete tier pathway from the file. As discussed above, a tier pathway may be determined to be obsolete based on the timestamp expiring based on a predetermined threshold of time.

Finally, as represented by block 470, the last step is to automatically mitigate downstream or upstream faults in response to determining fault relationships. For example, the system may repair or replace the faulty application. Such mitigation may include removing a faulty application from a tier pathway and replacing it with a non-faulty application. In some such embodiments, the tier pathway is "implemented" such that when the originating application is called by the originating system the non-faulty application replaced in the tier pathway is called as the dependent application rather than the faulty application. Such an implementation may include a hub system sending instructions including information related to the new or updated tier pathway to one or more spoke systems such that the originating application is no longer dependent upon the faulty application.

In some embodiments, mitigation of a faulty application may be in real-time or near real-time. For example, in some implementations different versions of the same or similar applications are housed or sourced from different servers such as a data center located in Location A and a different data center located in Location B. Typically such systems may provide redundancy in the case of an outage or other problem. Embodiments of the invention may leverage such redundancy data centers by automatically rerouting a dependent application call when a fault is detected by the system in the dependent application.

In some embodiments, two or more applications may share certain functionality but may not be identical. For example, Application A may include four (4) functions or tasks required by a particular process and Application B may only include three (3) of those functions or tasks, but may be considered a less than perfect but acceptable substitute for Application A in certain situations. This may be referred to as a "graceful degradation" situation. In such a situation, embodiments of the system may recognize a faulty application and re-route application calls involving the faulty application by implementing processes that utility the graceful degradation alternative to the original, but faulty application.

Figure 5A:
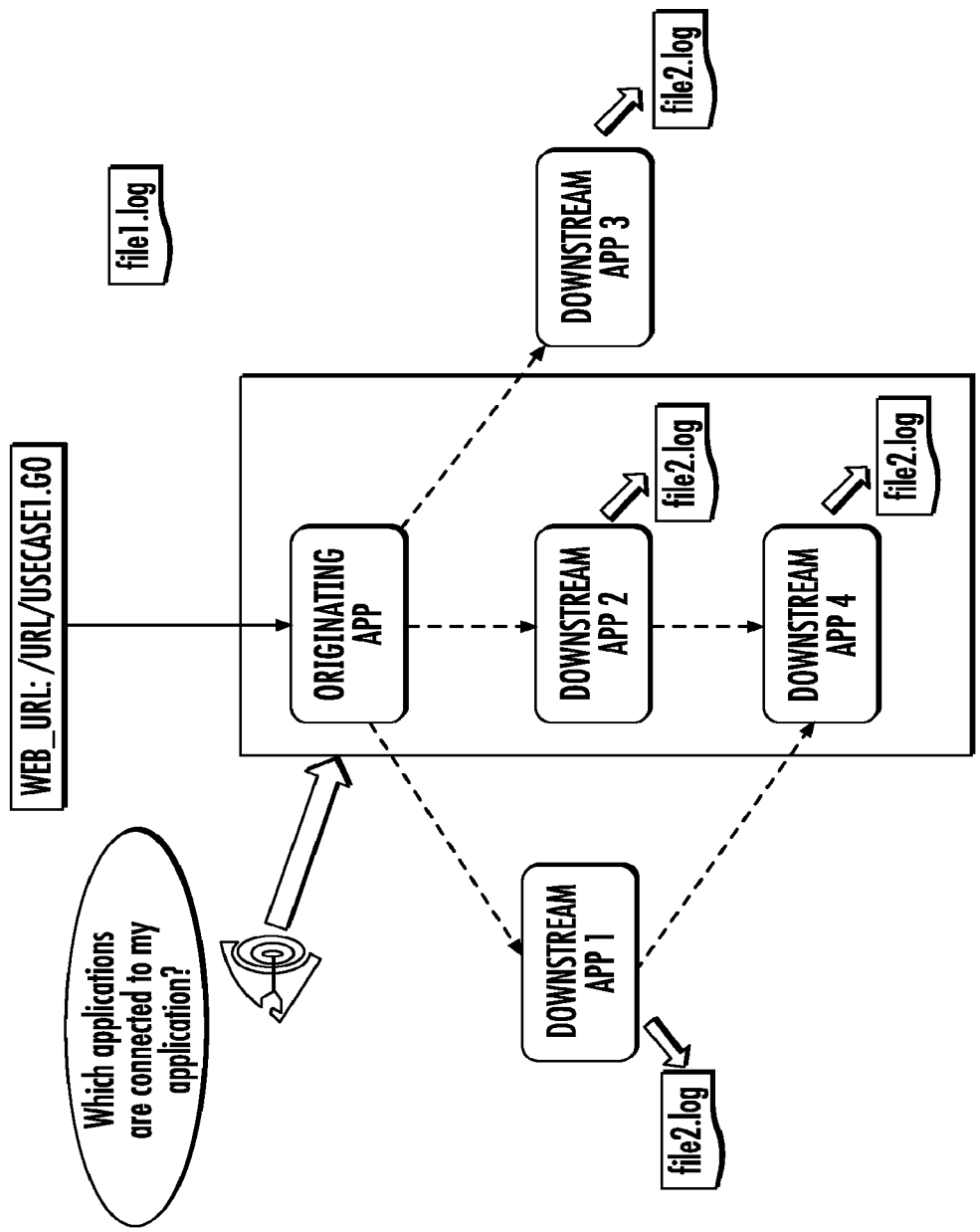
Figure 5B:
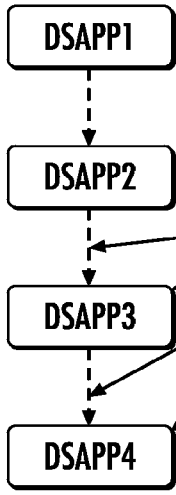

Referring now to FIG. 5A, an exemplary application dependency is illustrated. Referring now to FIG. 5B, an illustration of an exemplary tier pathway is shown. As discussed above, the tier pathway may be represented (in a transaction paragraph and/or the accessible file) by application calls or names such as ORIGAPP and DSAPP1, and the like. Also, the dots ( . . . . . ) in some embodiments represent a unilateral relationship such as the left-hand application being dependent upon the right-hand application and the dashes (- - - - -) represent both the left-hand and right-hand applications being dependent upon one another. In other words, if DSAPP1 is called, it is on the right-hand side of ORIGAPP and related by dots, which indicates it is not dependent upon ORIGAPP. On the other hand, DSAPP1 is related by dashes to DSAPP2, which means that it is dependent upon DSAPP2 and that DSAPP2 is also dependent upon DSAPP1.

Figure 5C:
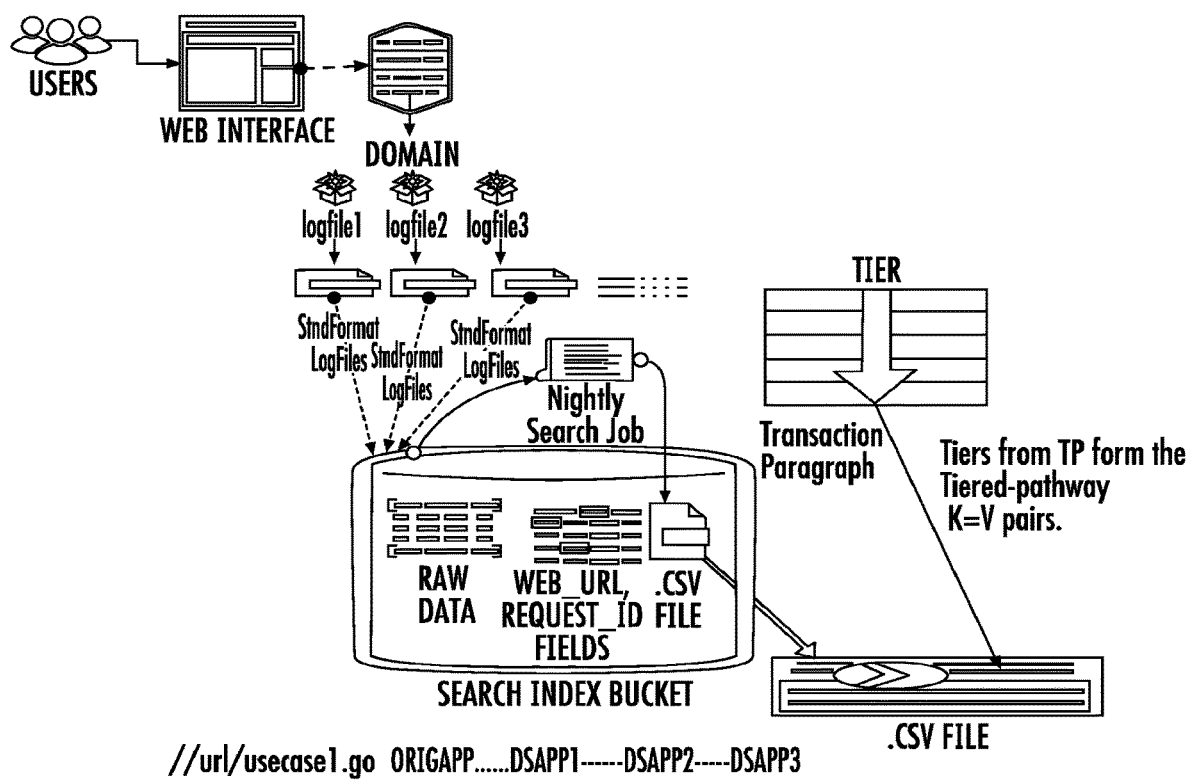

Referring now to FIG. 5C, a combined flowchart and block diagram illustrates an exemplary system for providing automatic resource dependency tracking and maintenance of resource fault propagation. As shown, users may use a web interface to access a domain of the system as described herein. The users may perform various actions which require applications and various dependent applications to be called. Alternatively and/or additionally, systems of the enterprise may also call applications and dependent applications automatically based on preprogrammed processes and such calls are not necessarily a direct result of actions by a user. When the applications and dependent applications are called, log files are created and stored in a standard format. Periodically, regularly, as needed, on-demand or otherwise, a search job may be performed across numerous systems, perhaps enterprise-wide. The search job analyzes the raw data and builds transaction paragraphs that are made up of application calls (i.e., links or URLs such as WEB URLs) and request IDs (i.e., a high level identifier that loosely corresponds to the tier in the tier pathway). Identical request ID values may be correlated and grouped such that they are built into a tier pathway. In some cases, only the request ID values that are within a close time proximity (such as one (1) minute or some other time) are considered to be correlated such that they relate to a single tier pathway. For each application call—request ID pair, a tier may be added to a correlated tier pathway. The transaction paragraphs are constructed in chronological format from top to bottom such that the application calls and request IDs within the transaction paragraph (which may also contain other data or information that may be irrelevant to the present process) are chronologically organized by their execution from top to bottom.

Thus, when the accessible file structure is created containing the tier pathways, a so-called ninety (90) degree rotation of the data structure occurs. That is, the transaction paragraph moving from top to bottom for each chronologically subsequent application call and dependent application call that forms a correlated group is converted to a left to right configuration as a tier pathway, as better illustrated in FIG. 5D.

The request IDs or tiers are related by "key-value" pairs. Such key-value or "K=V" pairs are relationships between "tiers" or application calls for the numerous applications of an organization. These K=V pair relationships are leveraged when users perform searches through the Tracing Dependency Dashboard and enable the system to identify dependency relationships for a search query.

Once the accessible file is completed during a periodic sweep, the system may be utilized for user searches. For example, searching for ORIGAPP through the dashboard would result in ORIGAPP. . . . . DSAPP1- - - - -DSAPP2- - - - -DSAPP3. Whereas searching for DSAPP2 would result in results of (i) DSAPP2- - - - -DSAPP3 and (ii) DSAPP2- - - - -DSAPP1; or DSAPP1- - - - -DSAPP2- - - - -DSAPP3, thereby indicating the bilateral dependencies between DSAPP2 and the other apps.

Referring now to FIG. 5D, a combined flowchart and block diagram illustrates construction of two tiered pathways, and thereby construction of an accessible file according to embodiments of the invention. As shown, each originating application is related to a set of K=V pairs for the originating application. For example, in some embodiments of the system, the first dependent application or "TIER_1" may be associated with a "1" in the tier pathway, thereby indicating that it is the first dependent application called when the originating application is called. Likewise, the second dependent application or "TIER_2" may be associated with a "2" in the tier pathway, thereby indicating that it is the second dependent application called when the originating application is called. To determine the timing of these application calls, the sweep references log files in standard format as discussed above. The log files include information indicating the timing of the various application calls in the enterprise. For example, the log files may indicate that application TIER_1 was called as a dependent application to WEB_URL_1 at a time of (0283), whereas application TIER_2 was called as a dependent application to WEB_URL_1 at a time of (5423), which is subsequent in time to the call of application TIER_1. As noted above, when creating the tier pathway, the system may therefore assign TIER_1 a value of "1" indicating it was the first dependent application called in dependency of WEB_URL_1 and so forth.

In some cases, the system can cause presentation of a user interface (also referred to as a Dependency Tracing Dashboard). Referring to FIGS. 6A and 6B, representations of screenshots of a user interface running on a user system (or other system) are illustrated according to embodiments of the invention. FIG. 6A shows a user search start screen for the dashboard and enables the user to perform both generic searches as well as originating application and tier searches. FIG. 6B illustrates a representation of the accessible file and/or a set of large search results. As shown, for each unique application call or WEB_URL there is a tier pathway. If the user performed a search for usecase1, row one (1.) would be returned indicating a relationship between APP1 and APP2 of APP1 . . . . . APP2. Similarly, if the user performs a search for usercase12, then the tier pathway returned would be "1. . . . . 6- - - - -10- - - - -12- - - - -5", which has been simplified in the figure by changing "APP1" to "1" and the like.

In some cases, embodiments of the system allow for creation of group and user representations and designation of application types to the groups and individual users. Embodiments of the system herein described provides for existing tier pathways to be changed/edited (i.e., for application dependencies, both upstream and downstream), new tier pathways added or obsolete pathways to be deleted and, as a result of such changes/additions/deletions, automatically adapt all downstream and upstream application dependencies that are affected by the change or addition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for providing automatic resource dependency tracking and maintenance of resource fault propagation, the apparatus comprising:
    a computing platform having a memory and at least one processor in communication with the memory, the memory comprising computer-executable instructions, wherein the computer-executable instructions are executable by the at least one processor and configured to:
        perform an initial query configured to identify any application calls performed in a predetermined period of time,
        for each identified application call, build a corresponding transaction paragraph comprising a list of all sub-application calls performed in response to the application call,
        from each transaction paragraph, extract a chronological sequence of sub-application calls found in the transaction paragraph,
        form a tier pathway for each transaction paragraph, the tier pathway comprising the application call and each sub-application call, a timestamp indicating a date and time of discovery of the tier pathway and information indicating (i) the chronological sequence relating the application call and the sub-application calls, and (ii) one of a unilateral or bilateral dependency between each call in the tier pathway,
        periodically perform subsequent queries configured to identify application calls performed in a predetermined period of time,
        in response to each of the subsequent queries, update the timestamp for each preexisting tier pathway in an accessible file that stores the tier pathways, wherein the update of the timestamp indicates the date and time of the re-discovery of the tier pathway during a subsequent query;
        in response to each of the subsequent queries, (i) determine which of the identified application calls are unique and (a) eliminate duplicate application calls from an application call list, and (b) reduce the application call list to a predetermined threshold number of application calls of unique calls, and (ii) build a transaction paragraph comprising a list of all sub-application calls performed in response to the application call for each of the application calls included in the application call list;
        in response to determining that one or more tier pathways stored in the accessible file is obsolete by examining the timestamp of tier pathway and determining that the timestamp is older than a predetermined threshold of time, purge the one or more tier pathway determined to be obsolete from the accessible file; and
        provide a dependency tracing and tracking dashboard configured to receive a user input of an application or tier of applications and, in response to receiving the user input, search the accessible file for tier pathways including applications calls associated with the application or tier of applications and, in response to the search, display the bilateral and the unilateral dependencies between the application or tier of applications and other upstream and downstream applications.

2. The apparatus of claim 1, wherein the computer-executable instructions are further configured to store each tier pathway in the accessible file.

3. The apparatus of claim 1, wherein the computer-executable instructions, when executed further cause the processor to:
    in response to at least one of the subsequent queries, add one or more additional tier pathways to the accessible file.

4. The apparatus of claim 1, wherein the computer-executable instructions are further configured to:
    in response to determining that one or more of the tier pathways are obsolete by recognizing that information included in a tier pathway is inaccurate, purge the one or more tier pathway determined to be obsolete from the accessible file.

5. The apparatus of claim 4, wherein the computer-executable instructions are further configured to:
    recognize that the information included in the tier pathway is inaccurate by determining that an originating application is dependent upon a specific downstream application.

6. The apparatus of claim 4, wherein the computer-executable instructions are further configured to:
    in response to purging the one or more tier pathways, add a new tier pathway to the accessible file.

7. A method for providing automatic resource dependency tracking and maintenance of resource fault propagation, the method comprising:
    performing, by a resource dependency system in operative communication with a first system and the plurality of networked communication channels, a query configured to identify any application calls performed in a predetermined period of time;
    for each identified application call, building, by the resource dependency system, a corresponding transaction paragraph comprising a list of all sub-application calls performed in response to the application call;
    from each transaction paragraph, extracting, by the resource dependency system, a chronological sequence of sub-application calls found in the transaction paragraph;

forming, by the resource dependency system, a tier pathway for each transaction paragraph, the tier pathway comprising the application call and each sub-application call, a timestamp indicating a date and time of discovery of the tier pathway and information indicating (i) the chronological sequence relating the application call and the sub-application calls, and (ii) one of a unilateral or bilateral dependency between each call in the tier pathway;

periodically performing, by the resource dependency system, subsequent queries configured to identify application calls performed in a predetermined period of time;

in response to each of the subsequent queries, updating the timestamp for each preexisting tier pathway in an accessible file that stores the tier pathways, wherein the update of the timestamp indicates the date and time of the re-discovery of the tier pathway during a subsequent query;

in response to each of the subsequent queries, (i) determining which of the identified application calls are unique and (a) eliminating duplicate application calls from an application call list, and (b) reducing the application call list to a predetermined threshold number of application calls of unique calls, and (ii) building a transaction paragraph comprising a list of all sub-application calls performed in response to the application call for each of the application calls included in the application call list; and in response to determining that one or more tier pathways stored in the accessible file is obsolete, purging the one or more tier pathway determined to be obsolete from the accessible file; and providing a dependency tracing and tracking dashboard configured to receive a user input of an application or tier of applications and, in response to receiving the user input, search the accessible file for tier pathways including applications calls associated with the application or tier of applications and, in response to the search, display the bilateral and the unilateral dependencies between the application or tier of applications and other upstream and downstream applications.

8. The method of claim 7, wherein the method further comprises:
in response to at least one of the subsequent queries, adding, by the resource dependency system, one or more additional tier pathways to the accessible file.

9. The method of claim 7, further comprising storing each tier pathway in the accessible file.

10. The method of claim 7, further comprising:
in response to determining that one or more of the tier pathways are obsolete by recognizing that information included in a tier pathway is inaccurate, purging the one or more tier pathway determined to be obsolete from the accessible file.

11. The method of claim 10, further comprising:
recognizing that the information included in the tier pathway is inaccurate by determining that an originating application is dependent upon a specific downstream application.

12. The method of claim 10, further comprising:
in response to purging the one or more tier pathways, adding a new tier pathway to the accessible file.

13. A computer program product for providing automatic resource dependency tracking and maintenance of resource fault propagation, the computer program product comprising:

a non-transitory computer-readable medium comprising:
a set of codes for causing a computer to perform a query configured to identify any application calls performed in a predetermined period of time;

a set of codes for causing the computer to, for each identified application call, build a corresponding transaction paragraph comprising a list of all sub-application calls performed in response to the application call;

a set of codes for causing the computer to, from each transaction paragraph, extract a chronological sequence of sub-application calls found in the transaction paragraph;

a set of codes for causing the computer to, form a tier pathway for each transaction paragraph, the tier pathway comprising the application call and each sub-application call, a timestamp indicating a date and time of discovery of the tier pathway and information indicating (i) the chronological sequence relating the application call and the sub-application calls, and (ii) one of a unilateral or bilateral dependency between each call in the tier pathway;

a set of codes for causing the computer to store each tier pathway in an accessible file;

a set of codes for causing the computer to periodically perform subsequent queries configured to identify application calls performed in a predetermined period of time;

a set of codes for causing the computer to, in response to each of the subsequent queries, update the timestamp for each preexisting tier pathway in the accessible file, wherein the update of the timestamp indicates the date and time of the re-discovery of the tier pathway during a subsequent query;

a set of codes for causing a computer to, in response to each of the subsequent queries, (i) determine which of the identified application calls are unique and (a) eliminate duplicate application calls from an application call list, and (b) reduce the application call list to a predetermined threshold number of application calls of unique calls, and (ii) build a transaction paragraph comprising a list of all sub-application calls performed in response to the application call for each of the application calls included in the application call list;

a set of codes for causing the computer to, in response to determining that one or more tier pathways stored in the accessible file is obsolete by examining the timestamp of tier pathway and determining that the timestamp is older than a predetermined threshold of time, purge the one or more tier pathway determined to be obsolete from the accessible file; and a set of codes for causing the computer to provide a dependency tracing and tracking dashboard configured to receive a user input of an application or tier of applications and, in response to receiving the user input, search the accessible file for tier pathways including applications calls associated with the application or tier of applications and, in response to the search, display the bilateral and the unilateral dependencies between the application or tier of applications and other upstream and downstream applications.

14. The computer program product of claim 13, wherein the computer-readable medium further comprises:

a set of codes for causing the computer to, in response to at least one of the subsequent queries, add one or more additional tier pathways to the accessible file.

15. The computer program product of claim 13, wherein the computer-readable medium further comprises:
a set of codes for causing the computer to in response to determining that one or more of the tier pathways are obsolete by recognizing that information included in a tier pathway is inaccurate, purge the one or more tier pathway determined to be obsolete from the accessible file.

16. The computer program product of claim 15, wherein the computer-readable medium further comprises:
a set of codes for causing the computer to recognize that the information included in the tier pathway is inaccurate by determining that an originating application is dependent upon a specific downstream application.

17. The computer program product of claim 15, wherein the computer-readable medium further comprises:
a set of codes for causing the computer to, in response to purging the one or more tier pathways, add a new tier pathway to the accessible file.

\* \* \* \* \*